(No Model.)
J. H. BURKS.
CRANK.
No. 296,272.  Patented Apr. 1, 1884.
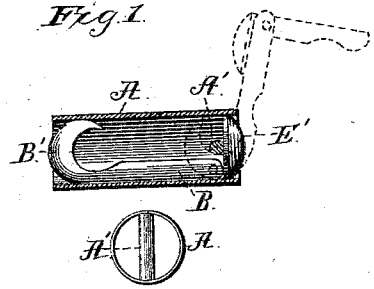
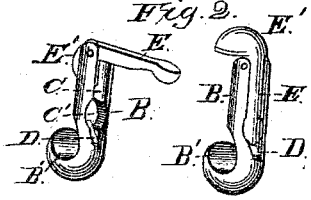
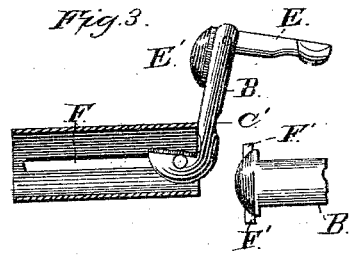
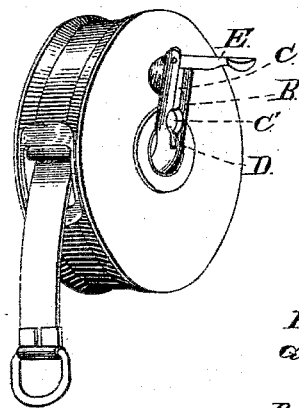
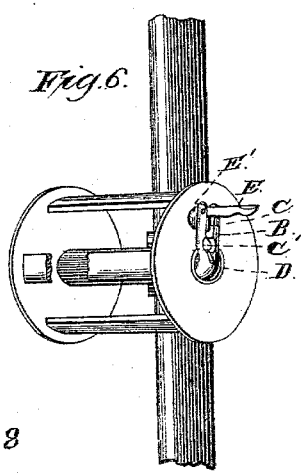
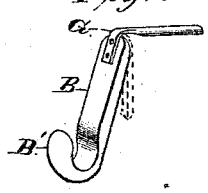
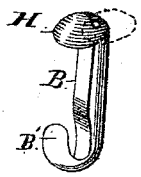
Witnesses
N. A. Clark.
P. B. Turpin.
Inventor
Jesse H. Burks
By R. S. & A. P. Lacey
Atty

UNITED STATES PATENT OFFICE.

JESSE H. BURKS, OF LOS ANGELES, CALIFORNIA.

CRANK.

SPECIFICATION forming part of Letters Patent No. 296,272, dated April 1, 1884.

Application filed December 6, 1883. (No model.)

*To all whom it may concern:*

Be it known that I, JESSE H. BURKS, a citizen of the United States, residing at Los Angeles, in the county of Los Angeles and State of California, have invented certain new and useful Improvements in Cranks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in hand-cranks; and it consists in the novel construction, combination, and arrangement hereinafter described and claimed.

In the drawings, Figure 1 is a sectional view of a casing provided with my improvements. Fig. 2 shows the arm and handle in detail. Figs. 3 and 4 are modifications. Figs. 5 and 6 show the application of the invention to tapelines and fishing-rod reels. Figs. 7 and 8 show modifications of the handle, all of which will be described.

The casing A is provided near one end with a transverse rod, A'. The arm B is fitted to be placed in the said casing, and is provided at one end with a hook, B', adapted to engage the rod A', and which is made sufficiently large and of a proper shape to close one end of the casing when stored therein, as shown in full lines, Fig. 1. This hook is extended to one side of the arm, which, on its opposite side, is grooved from what, for convenience of reference, I call its "outer end" nearly to its opposite end. This groove C is fitted to receive the handle, and at its inner end I form a mortise, C', to receive the enlarged end of said handle. In this mortise I arrange the spring D. The handle E is pivoted to the outer end of the arm, and is provided in rear of said pivot with a head, E', which is conformed in size and shape to the internal diameter of the casing, and serves as a means for closing the end thereof opposite that closed by hook B' when the parts B E are stored in the casing, as shown in Fig. 1. The handle E turns down against the arm B, fitting into the groove C, and its outer end bears against spring D, which, when the parts are folded and stored in the casing, forces the handle against the wall of the casing and binds the parts firmly therein.

It will be understood that ordinarily the parts B E could be fitted tightly to the casing, so that they would of their friction be prevented from falling out of the casing when stored as described. I prefer, however, to use a spring, as described, as thereby the parts are held more firmly than where friction alone is relied on.

In operation, when not in use, the arm and handle are folded and stored in the casing, as shown in Fig. 1. When it is desired to operate the crank, a slight pressure on the hook end of the arm B will force the parts out of the opposite end of the casing, where they may be unfolded, as indicated in dotted lines, and used to revolve the casing A, as will be readily understood.

I prefer to form the hook B' and head E' of suitable size and shape to close the ends of the casing, as thereby dust, &c., are excluded, and a neater appearance is given the article. I do not, however, wish to be limited to such forms, as they may be varied at the will of the maker. Neither do I desire to be limited to the cylindrical form of the casing, as it will be understood it might be made of an angular, oval, or other cross-sectional shape desired; and, where so desired, instead of having its walls solid, as shown in Fig. 1, it might be composed of a series of slats, as shown in Fig. 4. It will be further observed that if the casing were provided with internal diametrically-opposite grooves or slots, F, and the inner end of the arm with lateral studs F', as shown in Fig. 3, the same results would be had by use of the construction shown in Fig. 1—namely, the arm would be held from detachment from the casing, and yet might, when not in use, be stored therein, as will be understood. For light use—such as tape-measures—it will be appreciated.

The handle might be dispensed with, though I prefer its use, and also to construct it as shown in Figs. 1, 2, 3, 5, and 6. However, where so desired, the groove in the side of the arm might be dispensed with, and the handle turned flat against the side of the arm.

Many modifications in the form of the handle may be made.

In Fig. 7 the handle consists simply of a piece of spring-plate metal, G, having one end secured to the outer end of the arm, and bent so that normally its other end would project out at right angles to said arm. The outer end of this plate may, if so desired, be rolled on its opposite edges to form a proper rounded hand-hold, as shown. When not in use, this handle G may be pressed down against the arm, as indicated in dotted lines, and when stored in the casing the tension of the spring-handle will serve as a substitute for the spring D, preferably used in connection with the construction shown in Figs. 1, 2, and 3.

In Fig. 8 the handle is formed of a plate, H, swiveled near one edge on the other end of the arm, so that when stored it may be arranged as shown in full lines, and when in use it may be turned, as indicated in dotted lines, to serve as a handle.

My invention is applicable to various devices, such as hoisting-windlasses, certain classes of fire-escapes, tape-measures, fishing-rod reels, and most other machines in which it is desired to wind a cord, tape, &c., on a drum or spool.

Having thus described my invention, what I claim, and desire to secure by Letters Patent, is—

1. In a crank, the combination of a suitable casing and the arm held to the casing, substantially in the manner described, whereby when not in use it may be stored entirely within the casing, substantially as and for the purposes specified.

2. The combination, as set forth, of a suitable casing, the arm having one end movable out of said casing, and provided with a handle, and means whereby said arm is held from detachment from said casing, substantially as set forth.

3. In a crank, the combination of the casing, the arm, the handle held to one end of the arm in position to be turned down against the same, and a spring whereby the arm and handle, when incased, are forced apart and bind the walls of the casing, as set forth.

4. In a crank, the combination of the casing, the arm having one end movable out of, and its other end provided with means whereby it is held in, the casing, and formed with a head approximating in diameter that of the casing, and the handle pivoted to the outer end of the arm, and provided in the rear of said pivot with a cap or head fitted to the casing, substantially as and for the purposes specified.

5. In a crank, the casing provided at or near one end with a transverse rod, combined with the arm having a hook formed on one end, adapted to engage said transverse rod in the operation of the device, substantially as set forth.

6. The crank, substantially as hereinbefore described, consisting, in connection with a suitable casing, of the arm, the handle pivoted at one end of said arm, means whereby the arm and casing are held from detachment, said arm and handle being constructed and arranged substantially as described, whereby when not in use they may be stored within the casing, substantially as set forth.

In testimony whereof I affix my signature in presence of two witnesses.

JESSE H. BURKS.

Witnesses:
WILLIAM FAXON, Jr.,
EDWARD F. MCLAUGHLIN.